(12) United States Patent
Puri

(10) Patent No.: US 7,747,070 B2
(45) Date of Patent: Jun. 29, 2010

(54) TRAINING CONVOLUTIONAL NEURAL NETWORKS ON GRAPHICS PROCESSING UNITS

(75) Inventor: Siddhartha Puri, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1140 days.

(21) Appl. No.: 11/217,711

(22) Filed: Aug. 31, 2005

(65) Prior Publication Data

US 2007/0047802 A1 Mar. 1, 2007

(51) Int. Cl.
*G06K 9/62* (2006.01)
*G06F 15/18* (2006.01)
*G06E 1/00* (2006.01)
*G06E 3/00* (2006.01)
*G06G 7/00* (2006.01)
*G06N 3/02* (2006.01)

(52) U.S. Cl. .................... 382/157; 382/158; 706/12; 706/15

(58) Field of Classification Search ............... 382/157, 382/158; 706/12, 15
See application file for complete search history.

(56) References Cited

U.S. PATENT DOCUMENTS

| | | | | |
|---|---|---|---|---|
| 5,647,027 | A * | 7/1997 | Burges et al. | 382/275 |
| 6,128,606 | A | 10/2000 | Bengio et al. | |
| 6,553,131 | B1 * | 4/2003 | Neubauer et al. | 382/105 |
| 2003/0174881 | A1 * | 9/2003 | Simard et al. | 382/159 |
| 2005/0025355 | A1 * | 2/2005 | Simard et al. | 382/159 |
| 2005/0091050 | A1 | 4/2005 | Surendran et al. | |
| 2005/0125369 | A1 * | 6/2005 | Buck et al. | 706/12 |

FOREIGN PATENT DOCUMENTS

EP 1345161 A2 9/2003

OTHER PUBLICATIONS

International Search Report from PCT/US2006/032349 dated Jan. 11, 2007, 3 pages.
Y. LeCun, L. Bottou, Y. Bengio, P. Ha.ner, "Gradient-based learning applied to document recognition," *Proceedings of IEEE*, pp. 2278-2324, 1998.
Y. LeCun, Y. Bengio, "Convolutional networks for images, speech and time series," *The handbook of brain theory and neural networks*, pp. 255-258, MIT Press, 1998.
P.Y. Simard, D. Steinkraus, J.C. Platt, "Best Practices for Convolutional Neural Networks Applied to Visual Document Analysis," *Proc. International Conference on Document Analysis and Recognition*, pp. 958-962, 2003.
Bishop, Christopher M., "Neural Networks for Pattern Recognition", Chapter 4, Oxford University Press, 1995, pp. 116-163.

(Continued)

*Primary Examiner*—Samir A Ahmed
*Assistant Examiner*—Li Liu
(74) *Attorney, Agent, or Firm*—Klarquist Sparkman, LLP

(57) ABSTRACT

A convolutional neural network is implemented on a graphics processing unit. The network is then trained through a series of forward and backward passes, with convolutional kernels and bias matrices modified on each backward pass according to a gradient of an error function. The implementation takes advantage of parallel processing capabilities of pixel shader units on a GPU, and utilizes a set of start-to-finish formulas to program the computations on the pixel shaders. Input and output to the program is done through textures, and a multi-pass summation process is used when sums are needed across pixel shader unit registers.

18 Claims, 8 Drawing Sheets

OTHER PUBLICATIONS

Anguita et al., "An Efficient Implementation of BP on RISC-Based Workstations," Neurocomputing, vol. 6, No. 1, Feb. 1994, pp. 57-65.

Bohn, "Kohonen Feature Mapping Through Graphics Hardware," 3rd Intl. Conf. on Computational Intelligence and Neurosciences, Oct. 24-28, 1998.

Chellapilla et al., "High Performance Convolutional Neural Networks for Document Processing," Mar. 1, 2006, http://www.research.microsoft.com/en-us/um/people/kumarc/papers/chellapilla_iwfhr2006_ConvNNGPU.pdf.

European Search Report received in co-pending European Patent Application No. EP06801862, Feb. 17, 2010, 4 pages.

Goodnight et al., "Computation on Programmable Graphics Hardware," Computer Graphics & Applications Magazine, vol. 25, No. 5, Aug. 26, 2005, pp. 12-15.

Oh et al., "GPU Implementation of Neural Networks," Pattern Recognition, vol. 37, No. 6, Apr. 12, 2004, pp. 1311-1314.

Owens et al., "A Survey of General-Purpose Computation on Graphics Hardware," Aug. 17, 2005, http://www.rudomin.cem.itesm.mx/{rudomin/Isaac%20Rudomin_files/cursos_files/GPGPU/ASurveyofGeneralPurposeComputationonGraphicsHardware.pdf.

Rolfes, "Artificial Neural Networks on Programmable Graphics Hardware," Game Programming Gems 4, Mar. 2004, pp. 373-378.

Simard et al., "Best Practices for Convolutional Neural Networks Applied to Visual Document Analysis," Proceedings of the $7^{th}$ Intl. Conf. on Document Analysis and Recognition, Aug. 3, 2003, pp. 958-963.

Steinkraus et al., "Using GPUs for Machine Learning Algorithms," Proceedings of the $8^{th}$ Intl Conf. on Document Analysis and Recognition, vol. 2, Aug. 29, 2005, pp. 1115-1120.

\* cited by examiner

Software 880 Implementing Convolutional
Neural Network Training

TRAINING CONVOLUTIONAL NEURAL NETWORKS ON GRAPHICS PROCESSING UNITS

BACKGROUND

Neural Networks

Certain computer problems, such as character recognition and image recognition are known to be well-handled by machine-leaning techniques. Chief among these is the use of neural networks. Neural networks are a class of algorithms based on a concept of inter-connected "neurons." In a typical neural network, neurons contain data values, each of which affects the value of a connected neuron according to connections with pre-defined strengths, and whether the sum connections to each particular neuron meets a pre-defined threshold. By determining proper connection strengths and threshold values (a process also referred to as "training"), a neural network can achieve efficient recognition of images and characters. Oftentimes, these neurons are grouped into "layers" in order to make connections between groups more obvious and to each computation of values.

FIG. 1 illustrates a simplified block diagram of a neural network which is interpreting a sample 100 of a handwritten letter "m." In the illustrated example, values in illustrated neurons are either 0 or 1. This is done to simplify illustration and does not limit the range or types of values that can be found in neural network neurons. In the illustrated example, an electronic image of the handwriting sample is used to create a set of values for the input layer 210, or "layer 0." In some implementations, this can be done by directly mapping each pixel of the sample 200 to a particular neuron in layer 0, such that each neuron shows a 1 or a 0 depending on whether the pixel is on or off. Another example method of assigning values to neurons is discussed below with reference to convolutional neural networks. Depending on the vagaries of the neural network and the problem it is created to solve, each layer of the network may have differing numbers of neurons, and these may or may not be related to particular qualities of the input data.

As FIG. 1 shows, various neurons in layer 0 are connected to neurons in the next layer, layer 1 (120). In one implementation, called a fully-connected neural network, each of the neurons in a particular layer is connected to those in the next layer. In the example of FIG. 1, this is partially illustrated by showing the connections of two neurons to every neuron in layer 1. Each neuron in layer 1, then, receives an input value from each of the neurons in layer 0. These input values are then summed and this sum compared to a bias, or threshold. If the value exceeds the threshold for a particular neuron, that neuron then holds a positive value which can be used as input to neurons in the next layer of neurons. This computation continues through the various layers of the neural network, until it reaches a final layer 130, here called "layer n." At this point, the output of the neural network routine can be read from the values in layer n. In one implementation of a network used in character recognition, each value in the layer is assigned to a particular character. In this implementation, the network is configured to end with the output layer having only one large positive value in one neuron, which then demonstrates which character the network has computed to be the most likely handwritten input character.

However, these connections can be computationally complex, as FIG. 2 illustrates. FIG. 2 is a block diagram of a method of computing neuron values based on the values found in the previous layer. It should be noted that while FIG. 2 illustrates various matrices, the indexes (or sizes) of the matrices will vary from layer to layer and network to network and various implementations may orient the matrices or map the matrices to computer memory differently. As FIG. 2 illustrates, one method of implementing neural networks is to treat each level as a matrix of neuron values, as is illustrated by layer 0 matrix 210. Connection strengths can then be implemented as a transformation matrix 220, which is multiplied by the layer 0 matrix 210. This multiplication allows each value in the previous layer to be scaled according to connection strengths, and then summed, all through normal matrix multiplication. After the multiplication is performed, a bias matrix 230 is then added to the product matrix to account for the threshold of each neuron in the next level. Then a sigmoid function (in one implementation, tan h( )) is applied to each resultant value to determine if the threshold was met, and the resulting values are placed in the matrix for the next layer. This can also be called a "squashing function." Thus, as FIG. 2 shows, the connections between each layer, and thus an entire network, can be represented as a series of matrices. Finding proper values for these matrices, then, is the problem of training a neural network.

While FIG. 2 illustrates that neural networks can be implemented as matrices, computation of the neural networks, and training of the neural networks, as described below, involves many mathematical computations. Additionally, non-fully-connected neural networks can require an even greater degree of computational complexity.

SUMMARY

A pixel shader program achieves efficient training of a convolutional neural network on a graphics processing unit. For example, a convolutional neural network is implemented on a graphics processing unit as a series of textures. The network is then trained through a series of forward and backward passes, with convolutional kernels and bias matrices modified on each backward pass using the gradient descent method according to a gradient of an error function.

The implementation takes advantage of parallel processing capabilities of pixel shader units on a GPU to efficiently compute forward and backward passes in parallel. It also utilizes an exemplary set of start-to-finish formulas to perform the computations on the pixel shader units. In one example, input and output to the program is done through textures, which are also operated on during computation. In another example, a multi-pass summation process is used when sums are needed across pixel shader unit registers. The various techniques and systems can be used in combination or independently.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

DETAILED DESCRIPTION

The following description relates to training of convolutional neural networks on graphics processing unit ("GPU") architectures, particularly for the recognition of handwriting. The GPU performs repeated forward passes and backward passes on input data, modifying and refining matrices which comprise the neural network on each pass. Many of the techniques described herein have been designed to take advantage of efficiencies of a GPU and utilize pixel shader programs which are designed to execute efficiently on a GPU.

1. GPU Architecture

Figure 1:
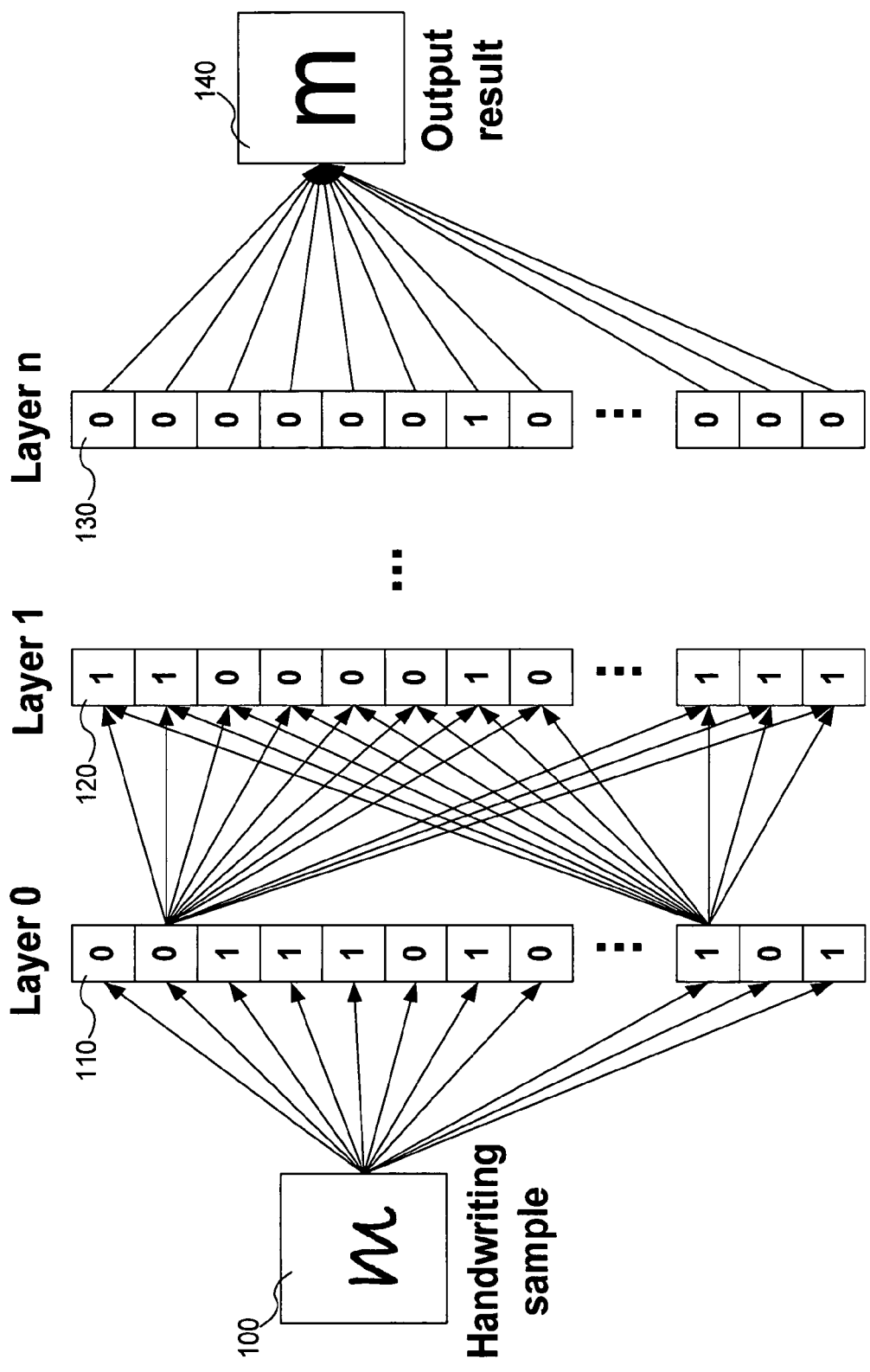
FIG. 1 is a block diagram of a conventional fully-connected neural network.
Figure 2:
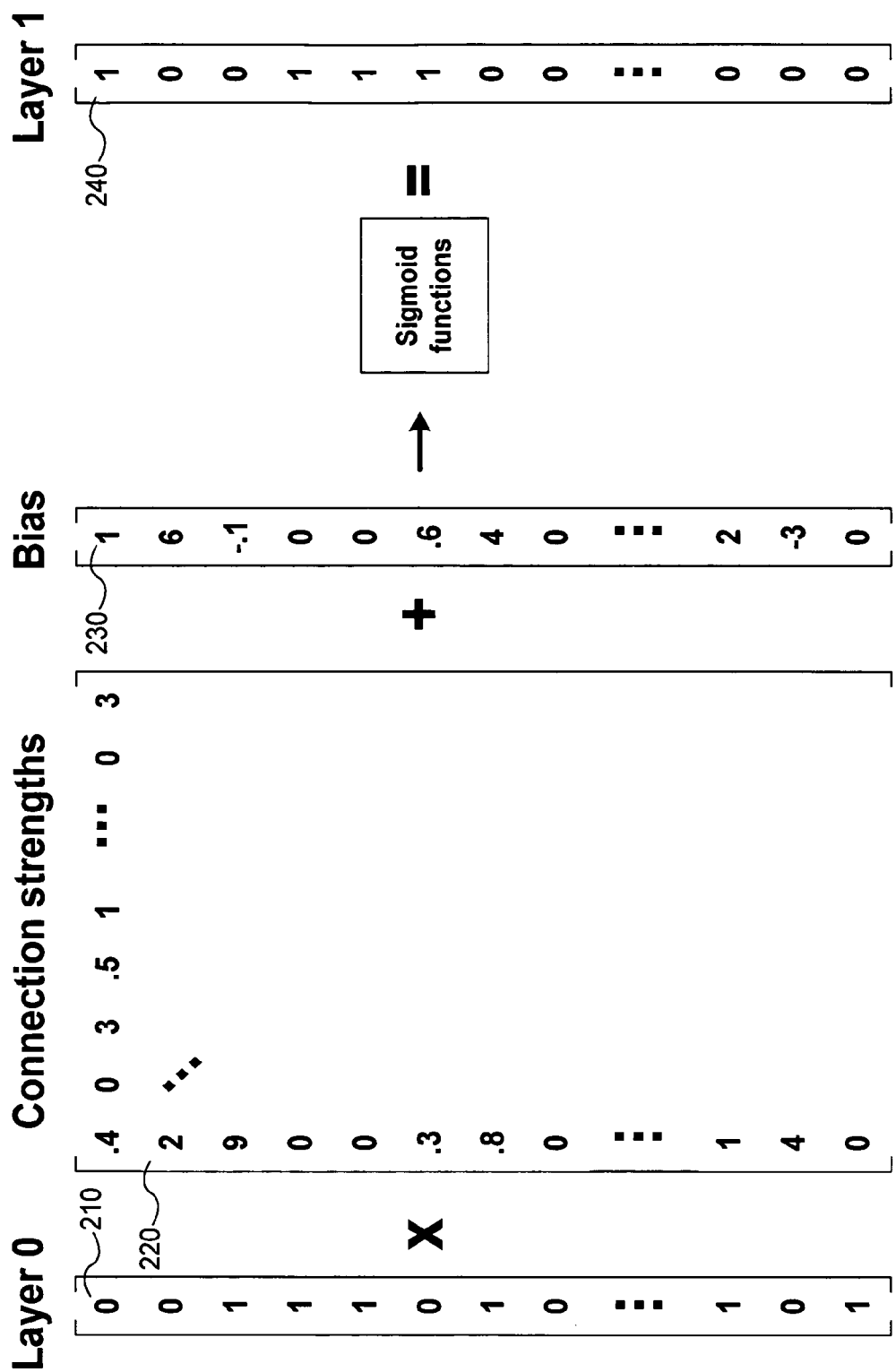
FIG. 2 is a block diagram of a matrix implementation of connections between two layers of a fully-connected neural network.
Figure 3:
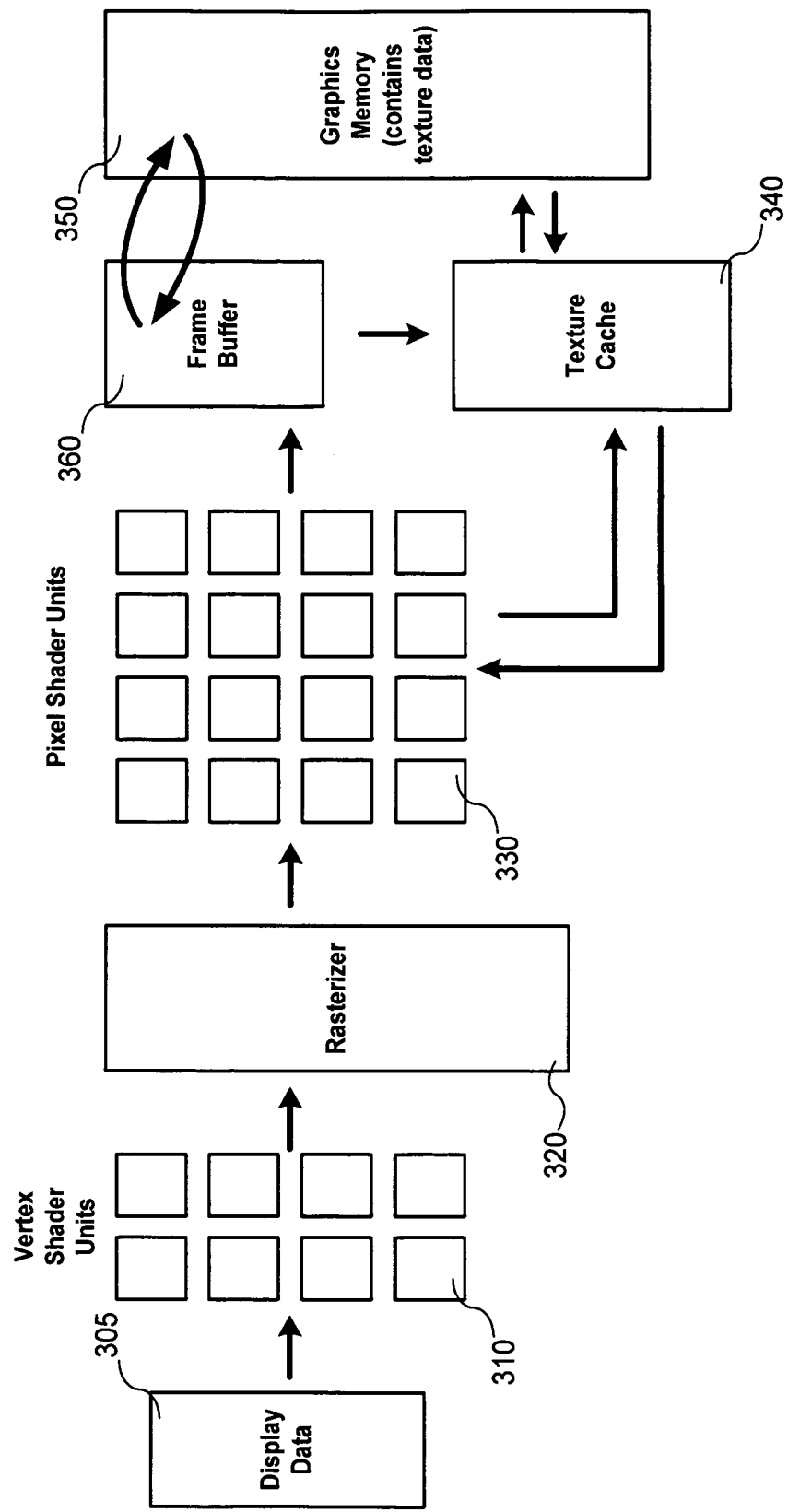
FIG. 3 is a block diagram of a graphics processing unit architecture.

The techniques described herein are implemented on a graphics processing unit. One example of a graphics processing unit is shown in FIG. 3, which illustrates a simplified overview of a traditional GPU architecture 300. In one implementation, the GPU architecture corresponds to the GPU 815 illustrated in FIG. 8. Display data 305, which describes geometry of an image to be rendered, is input into vertex shader units 310, which generate polygonal representations of the geometric forms. These geometric forms are then input into a rasterizer, which interpolates the polygons and samples them to develop a sample set of points in image space, which can then be shaded and have texture added to them. These points are then passed to a series of programmable pixel shader units 330 and which utilize parallel computing techniques to perform shading of the points, as well as adding and manipulating textures. It is this ability to perform parallel computations as well as to manipulate textures which makes the GPU, and the pixel shader units in particular, a useful platform for neural network computation. Pixel shader unit computation is frequently performed under the control of pixel shader programs, which are GPU-executable programs written to take advantage of the pixel shader units.

Textures, which can be pre-loaded into graphics memory 350 by a computer CPU before training, are cached in texture cache 340. Once these processes are complete, the image points can then be placed in a frame-buffer 360 before being transferred to graphics memory 350. In various implementations of the techniques herein, however, both input data to the neural network, as well as output data will be kept in textures. Thus, in various implementations, image point output to the frame buffer is ignored or not created at all.

2. Convolutional Neural Networks

Figure 4A:
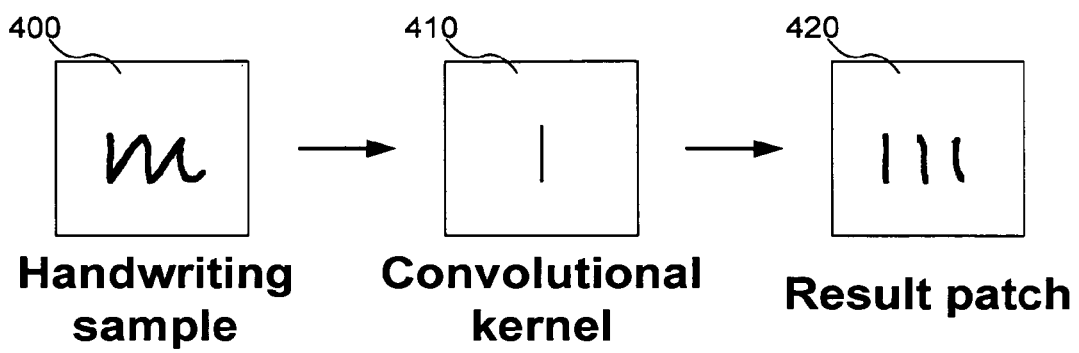
FIGS. 4a and 4b are block diagrams of two examples of actions of convolutional kernels on a handwriting sample.
Figure 4B:
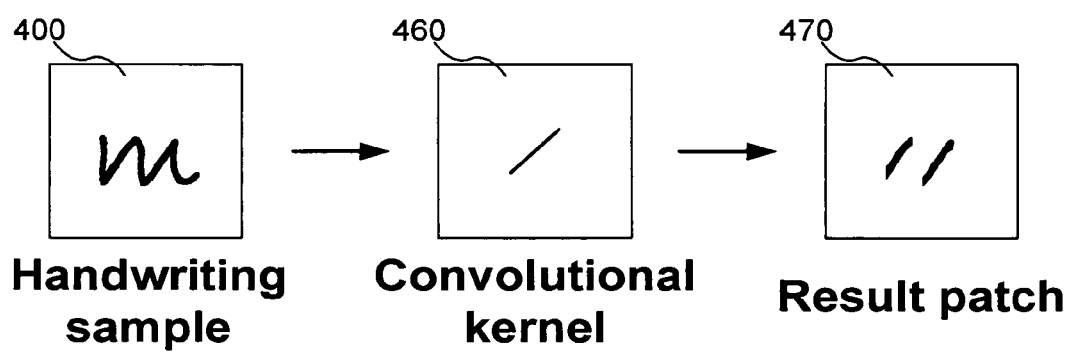

While the fully-connected neural networks described above are able, when properly trained, to recognize handwriting, they oftentimes fail to take advantage of shape and proximity when operating on input. One reason for this is that every pixel is operated on independently, ignoring adjacent pixels. For this reason, convolutional neural networks are also used, which operate by associating an array of values with each neuron, rather than a single value. Conceptually, this array can be thought of as a small patch of an image. The transformation of a neuron value for the subsequent layer is generalized from multiplication to convolution. This implies that the connection strengths 230 are convolution kernels rather than scalar values. FIGS. 4a and 4b show two examples of convolutional kernels operating on a sample 400 of a letter "m." In FIG. 4a, the sample is combined with a convolution kernel 410 representing a vertical line. The resulting patch of pixels 420 comprises the three vertical lines which are present in the sample. Similarly, in FIG. 4b, the handwriting sample 450 is combined with a convolutional kernel 460 representing a diagonal line going up and to the right. This results in a patch of pixels 460 which contains the two diagonal lines of the input character. As FIGS. 4a and 4b show, the two result patches show different information for the character, while preserving pixel adjacency. This can result in more efficient character recognition.

However, these more complex transformations involve more complex neural network matrices. Thus, while a matrix in a fully-connected network comprises an array of number values, in a convolutional neural network, each matrix entry is a rectangular (or square) patch of pixels; similarly the bias matrix comprises patches, and the sigmoid function is performed on each element of each patch. Additionally, rather than computing simple matrix multiplication, computations in convolutional neural networks involve more complex mathematics, with increased parallel computation required. One example of computations underlying an implementation of a convolutional neural network is described below in Section 4. Additional information on convolutional networks can be found in P. Y. Simard, D. Steinkaus, and J. C. Platt, "Best Practices for Convolutional Neural Networks Applied to Visual Document Analysis," *Proc. International Conference on Document Analysis and Recognition*, pp. 958-962, 2003, which is herein incorporated by reference.

3. Training Procedure

Figure 5:
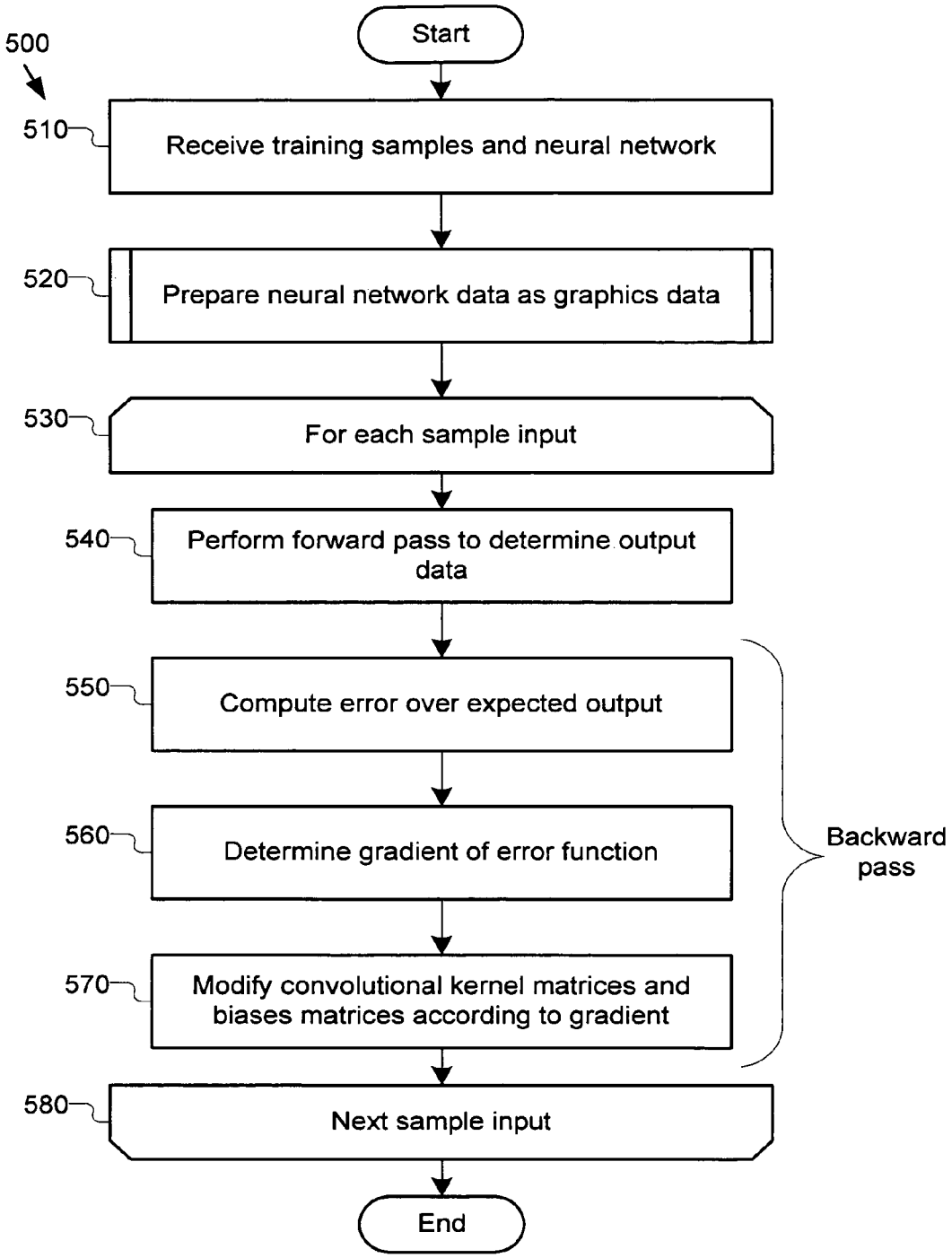
FIG. 5 is a flow diagram of a representative training process for convolutional neural networks on a graphics processing unit.

FIG. 5 shows an example process 500 for training a convolutional neural network. In various implementations of the process 500, actions may be removed, combined, or broken up into sub-actions. The process begins at action 510, where the process received a neural network to train, as well as training samples. In a typical implementation, the network may be pre-set with sample convolutional kernels and biases, but each needs to be refined to give consistent and efficient results. Training samples typically involve many (on the order of tens of thousands) samples of handwritten characters, along with an indication of the correct character each should be interpreted as. Next at action 520, neural network data, such as the samples and neural network matrices, are prepared to be operated on as graphics data by the pixel shader units 330 of the GPU 300. An example process of this action is described in greater detail below with respect to FIG. 6. In one implementation, both of the actions 510 and 520 are performed by a CPU associated with the GPU 815. In another, all preparation is performed by the GPU 815.

As FIG. 5 shows, each of these samples will be input into the convolutional neural network and the output calculated to determine how close or far off of the proper character recognition the network was. This is called a "forward pass." Then, the degree of error with relation to each of the matrices with comprise the network is determined, through what is called a "backward pass" and the matrices are then modified to adjust for the error. Following the common practice of general-purpose GPU programming, the implementation described herein is written as a series of pixel shader programs.

Thus, at action 530, the GPU enters a loop for each sample input. At action 540, the neural network is propagated on a forward pass to determine an output for a given sample. Next, at action 550, an error function is used to compute how far off of the expected output the neural network was. Next, at action 560, a gradient function is determined for the error function. By computing a gradient function, which comprises partial derivatives for each entry of each neural network matrix with respect to the error, the GPU can compute how much to adjust each matrix according to the gradient descent method. Then, at action 570, the matrices, including the convolutional kernels and the biases, are modified according to the gradient function. The actions 550, 560, and 570 are collectively known as a "backward pass" because they take the output error information and use it to determine needed modifications for each neural network matrix. Examples of one implementation of the equations used in these forward and backward passes are described in Section 4. Finally, at action 580, the forward-pass/backward-pass steps of process 500 are repeated as long as there are more sample inputs. At the end of the sample inputs, the network has been trained over those inputs and the process ends.

Figure 6:
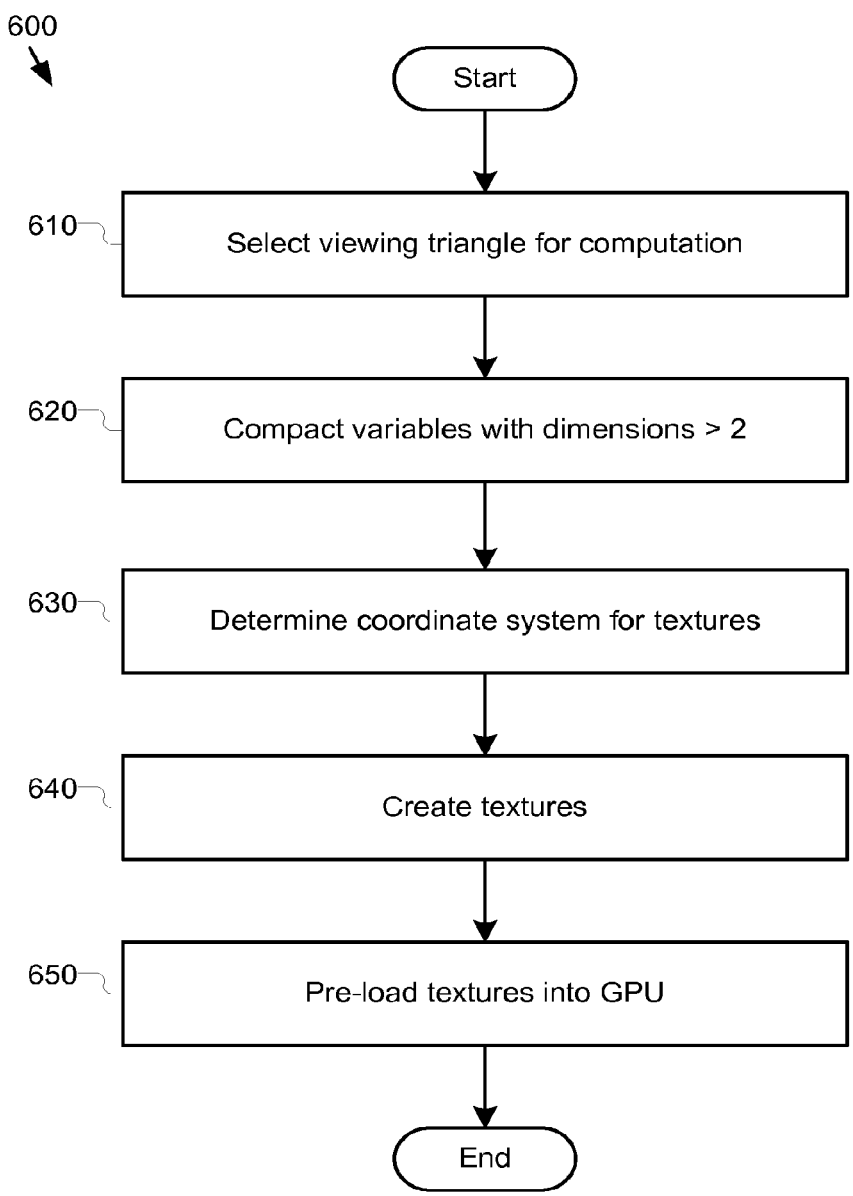
FIG. 6 is a flow diagram of a sub-process for preparing neural network data for computation on a graphics processing unit.

FIG. 6 shows an example process 600 for preparing neural network data as graphics data in action 520 of process 500. In various implementations of the process 600, actions may be removed, combined, or broken up into sub-actions. The process begins at action 610, where the process creates a scene consisting of a single triangle that covers the entire viewport. The process does this to prevent the rasterizer, and other stages of the GPU, from affecting the outcome of computation, allowing the process to focus on the pixel shader computation.

In the preferred implementation, each of data-parallel variable is stored as a two-dimensional texture. Some variables have more than two dimensions, however, so at action 620 they are embedded into a two-dimensional texture. For example, a variable $K^v$ can be "flattened" into $\overline{K^v}$ by the following equations (see section 4 below for notation):

$$K^v_{\langle i,j\rangle\langle x,y\rangle} = \overline{K^v_{is^v+x, js^v+y}} \qquad (3.1)$$

$$\overline{K^v_{i,j}} = K^v_{\langle \lfloor \frac{i}{s^v} \rfloor, \lfloor \frac{j}{s^v} \rfloor \rangle \langle i-\lfloor \frac{i}{s^v}\rfloor, j-\lfloor \frac{j}{s^v}\rfloor \rangle} \qquad (3.2)$$

Next at action 630, a coordinate system is determined for the textures. This must be done because the pixel shader units are designed to operate on "pixels", and thus the location of each "pixel" (in this case an element of a convolutional network matrix) must be determined. One method that has frequently been used is to associate "texture coordinate" information with the vertices of the triangle that is presented to the vertex shaders. The GPU can then interpolate the values of the texture coordinates at each output pixel, and supply the interpolated value in one of the pixel shader unit registers. This can be used not only to establish the identity of the pixel, but to pre-compute values needed during the execution of the pixel shader programs.

However, any non-trivial use of the interpolator functions of the rasterizer causes the programs to need to set the vertex data appropriately before each pass. The overhead of setting the data may outweigh any benefit gained from pre-computing values. An alternative implementation utilizes ShaderModel 3.0 by Microsoft Corporation and its vPos register. This register contains in its x and y components integer offsets from the top left corner of the output texture. The addresses needed to look up values from the input textures are then simple linear combinations of vPos. With the coordinate system determined, the process can then create the textures at action 630. Finally, at 640, textures are loaded into the GPU before processing begins. In one implementation, as many textures as possible, if not all, are loaded into graphics memory in order to prevent accesses to system memory by the GPU, which can slow down computation time. At this point the process ends.

4. Implementation and Derivation

Every example herein utilizes the ShaderModel 3.0 pixel shader system, although in other implementations other systems may be used. As discussed above, a neural network comprises some number N of layers of neurons, where each neuron has a numerical value. In this section, we refer to the vth layer as $l^v$. $l^v$ is a vector, whose length we denote as $n^v$, and whose ith element we write as $l_i^v$. Each layer $l^{v+1}$ is computed from the previous layer $l^v$ using the "learned parameters" $K^v$ and $b^v$. The goal of the training process is to find good values for these parameters, which these techniques do by gradient descent. As a notational convenience, we make use of the conditional operator $I_{\{c\}}$, which equals 1 if the condition c is true, and 0 otherwise. The derivation described herein presents equations for neural network training which are simplified and combined algebraically in order to reduce the number of invocations of pixel shader programs while performing these training techniques.

4.1 Fully-Connected Networks—Forward Pass

In order to understand the case of a convolutional neural network, it is helpful to compare to the relatively-simple case of a fully-connected network where N, the number of layers is equal to 2. In this case, during a forward pass, where each layer is calculated from the previous one, we compute $l^{v+1}$ by:

$$l^{v+1} = \sigma(\phi^v) = \sigma(K^v l^v + b^v) \qquad (4.1)$$

for $0 \leq v < N$. Here, $\sigma$ is a "squashing function" representing an element-wise application of tan h, $K^v$ is an $n^{v+1} \times n^v$ matrix representing connection strengths between the two layers, and $b^v$ is a vector of length $n^{v+1}$ representing the bias.

4.2 Fully-Connected Networks—Error Function

In order to use the output layer $l^N$ as a classifier for a character, we can distinguish between $n^N$ classes, and take $l_i^N$ as an indicator of the probability $\hat{p}_i$ that the input belongs to class i. To turn these $l_i^N$ into valid probabilities, we normalize them using a "softmax" function:

$$\hat{p}_i = \frac{e^{l_i^N}}{\sum_{j<n^N} e^{l_j^N}} \qquad (4.2)$$

If we know that the correct classification given the current input is t, then the ideal calculation should result in $\hat{p}_i = I_{\{i=t\}}$. The total deviation E from this ideal can be measured using a "cross-entropy" formula:

$$E = \sum_{i<n^N} I_{\{i=t\}} \ln \hat{p}_i = -\ln \hat{p}_t \qquad (4.3)$$

4.3 Fully-Connected Networks—Backward Pass

As described above, in order to train the various parameters of the neural network, gradient descent is used. This involves finding the partial derivative of the error function E with respect to each parameter $K^v$ and $b^v$. As a notational shorthand, we introduce the following:

$$\hat{\psi}^v = \frac{\partial E}{\partial l^{v+1}} \square \sigma'(\hat{\varphi}^v) \qquad (4.4)$$

where $\square$ denotes element-wise multiplication, and $\sigma'$ is an element-wise application of tan h'. The definition of E can then be plugged in to equation (4.4) to get:

$$\frac{\partial E}{\partial l_i^N} = -\frac{1}{\hat{p}_t} \frac{\partial \hat{p}_t}{\partial l_i^N} = \hat{p}_i - I_{\{i=t\}} \qquad (4.5)$$

$$\psi^{N-1} = (\hat{p}_i - I_{\{i=t\}}) \square \sigma'(\varphi^{N-1}) \qquad (4.6)$$

From this, we can conclude that for $0 \leq v < N$, $$\frac{\partial E}{\partial K^v} = \psi^v \otimes l^v \qquad (4.7)$$

$$\frac{\partial E}{\partial b^v} = \psi^v \qquad (4.8)$$

where $\otimes$ denotes an outer product. We can also conclude that, for $0 \leq v < N$, $$\psi^{v-1} = (k^v)^T \psi^v \square \sigma'(\phi^{v-1}) \qquad (4.9)$$

where $(K^v)^T$ represents the matrix transpose of $K^v$.

The preceding equations can then be implemented to modify neural network parameters by updating the parameters as follows:

$$K^v \leftarrow K^v - \gamma \frac{\partial E}{\partial K^v} \qquad (4.10)$$

$$b^v \leftarrow -\gamma \frac{\partial E}{\partial b^v} \qquad (4.11)$$

for $0 \leq v < N$, where $\gamma$ represents a learning rate. In one implementation, this learning rate is set to $10^{-3}$.

4.4 Convolutional Neural Networks—Forward Pass

In contrast to a fully-connected neural network, in a convolutional network each element $l_i^v$ of a layer is not a scalar, but a $p^v \times p^v$ square patch of numbers. Correspondingly, $K_{i,j}^v$ will be used to refer to a convolution kernel of size $s^v \times s^v$, and $b_i^v$ a $p^{v+1} \times p^{v+1}$ bias patch. Individual elements of the layers, biases, and kernels will be written as $l_i^v(x,y)^v$, $K_{i,j}^v(x,y)^v$, and $b_i^v(x,y)^v$, respectively.

The formula for computing $l^{v+1}$ is similar to the known formula for the fully-connected case:

$$l^{v+1} = \sigma(\hat{\phi}^v) = \sigma(K^v * l^v + b^v) \qquad (4.12)$$

However, here we use the * symbol is used to denote a somewhat unusual operation. Intuitively, it is similar to a matrix-vector product, but the innermost operation, instead of being a multiplication of scalars, is a convolution and subsampling of patches. More precisely, if $l^v$ is a length $n^v$ vector of $p^v \times p^v$ patches and $K^v$ is a $n^{v+1} \times n^v$ matrix of $s^v \times s^v$ kernels, then $w = K^v * l^v$ means that w is a length $n^v + 1$ vector of $p^{v+1} \times p^{v+1}$ patches and $$w_{(i)(x,y)} = \sum_{j<n^v} \sum_{\xi<s^v} \sum_{\eta<s^v} K_{(i,j)(\xi,\eta)}^v l_{(j)(2x+\xi,2y+\eta)}^v \qquad (4.13)$$

$$p^{v+1} = \frac{p^v - s^v}{2} + 1 \qquad (4.14)$$

It can be shown that the above is a generalization of the equations for a fully-connected case in the sense that when $p^v, s^v = 1$, then equations (4.12), (4.13), and (4.14) collapse into equations for a fully-connected network.

4.5 Convolutional Neural Networks—Error Function

The equations described above for an error function in a fully-connected network apply to a convolutional network as well.

4.6 Convolutional Neural Networks—Backward Pass

As mentioned above, during the backward pass, a gradient is found for the E utilizing the partial derivatives of E over each variable in the network. We start with $$\hat{\varphi}^v = \frac{\partial E}{\partial l^{v+1}} \square \sigma'(\hat{\varphi}^v) \qquad (4.15)$$

Where $\square$ denotes element-wise multiplication, and $\sigma'$ is an element-wise application of tan h used as a "squashing function," as described above. From equation (4.15), the derivatives are then summarized as:

$$\frac{\partial E}{\partial K^v} = \hat{\varphi} \otimes' l^v \qquad (4.16)$$

$$\frac{\partial E}{\partial b^v} = \hat{\varphi}^v \qquad (4.17)$$

$$\hat{\varphi}^{v-1} = (K^v)^{T*'} \hat{\varphi}^v \square \sigma'(\hat{\varphi}^{v-1}) \qquad (4.18)$$

where $(K^v)^T$ represents the matrix transpose of $K^v$.

Note that the operators *' and $\otimes$' as used in this application are non-standard. The $\otimes$' operator is similar to an outer product, but with the innermost multiplication replaced with convolution and subsampling. If $\hat{\phi}^v$ is a length $n^{v+1}$ vector of $p^{v+1} \times p^{v+1}$ patches and $l^{v+1}$ is a length $n^v$ vector of $p^v \times p^v$ patches, then $M = \hat{\phi}^v \otimes' l^v$ means that M is a $n^{v+1} \times n^v$ matrix of $s^v \times s^v$ patches and that:

$$M_{(i,j)(x,j)} = \sum_{\xi<p^{v+1}} \sum_{\eta<p^{v+1}} \hat{\varphi}_{(i)(\xi,\eta)}^v l_{(j)(2\xi+x,2\eta+y)}^v \qquad (4.19)$$

and $$s^v = p^v - 2p^{v+1} - 2 \qquad (4.20)$$

The *' operator is somewhat akin to a reverse of the * operator, as it expands, rather than contracts, convolution arguments. If M is an $n^v \times n^{v+1}$ array of $s^v \times s^v$ kernels and $\hat{\phi}^v$ is a length $n^{v+1}$ vector of $p^{v+1} \times p^{v+1}$ patches, then $u = M *' \hat{\phi}^v$ means that u is a length vector of $p^v \times p^v$ patches and $$u_{\langle i\rangle\langle x,y\rangle} = \sum_{j<n^{v+1}} \sum_{\xi<s^v} \sum_{\eta<s^v} I_{\{*'cond\}} M^v_{\langle i,j\rangle\langle \xi,\eta\rangle} \hat{\varphi}^v_{\langle j\rangle}\left(\frac{x-\xi}{2},\frac{y-\eta}{2}\right) \quad (4.21)$$

$$p^v = 2p^{v+1} + s^v - 2 \quad (4.22)$$

where "*' cond" is equivalent to meeting all of the following four conditions:

$$(x-\xi)|2 \quad (4.23)$$

$$(y-\eta)|2 \quad (4.24)$$

$$0 \leq \frac{x-\xi}{2} < p^{v+1} \quad (4.25)$$

and $$0 \leq \frac{y-\eta}{2} < p^{v+1} \quad (4.26)$$

As above, when $p^v, s^v = 1$, these backward pass formulas collapse into those for a fully-connected network.

4.7 Modeling Other Layers

In practice, a convolutional neural network has both convolutional and fully connected layers, that is, it has some layers where $p^v, s^v > 1$ and some where $p^v, s^v = 1$. While each layer can be mathematically modeled as a convolutional layer (since it is a generalization of the fully-connected case), it is computationally more efficient to detect the fully connected layers as a special case, and use the simpler formulas.

Additionally, there is another special case, which can be called a "transitional" layer. This is the case when $p^v, s^v > 1$ but $p^{v+1} = 1$. In this case the forward pass simplifies to:

$$l_i^{v+1} = \sigma\left(\sum_{j<n^v} \sum_{\xi<s^v} \sum_{\eta<s^v} K^v_{\langle i,j\rangle\langle \xi,\eta\rangle} l^v_{\langle j\rangle\langle 2x+\xi, 2y+\eta\rangle} + b_i^v\right) \quad (4.27)$$

Similarly, the backward pass simplifies to:

$$\left(\frac{\partial E}{\partial K^v}\right)_{\langle i,j\rangle\langle x,y\rangle} = \hat{\varphi}^v l^v_{\langle j\rangle\langle x,y\rangle} \quad (4.28)$$

and $$\hat{\varphi}^{v-1}_{\langle i\rangle\langle x,y\rangle} = \sum_{j<n^{v+1}} K^v_{\langle j,i\rangle\langle x,y\rangle} \hat{\varphi}^v_j \sigma'(\hat{\varphi}^{v-1}_i) \quad (4.29)$$

4.8 Multi-Pass Summation

The data-parallel nature of pixel shader units makes it hard to perform summations. Since the result at each pixel cannot depend on the result at other pixels, a way to regain efficiencies is to compute a summation in several passes, where each pass sums some fixed number of horizontally adjacent patches. If A is an n×m array of p×p patches, then a function $S_r$ can be defined as:

$$S_r(A)_{\langle i,j\rangle\langle x,y\rangle} = \sum_{j'=rj}^{rj+r-1} I_{\{j'<m\}} A_{\langle i,j'\rangle\langle x,y\rangle} \quad (4.30)$$

Figure 7:
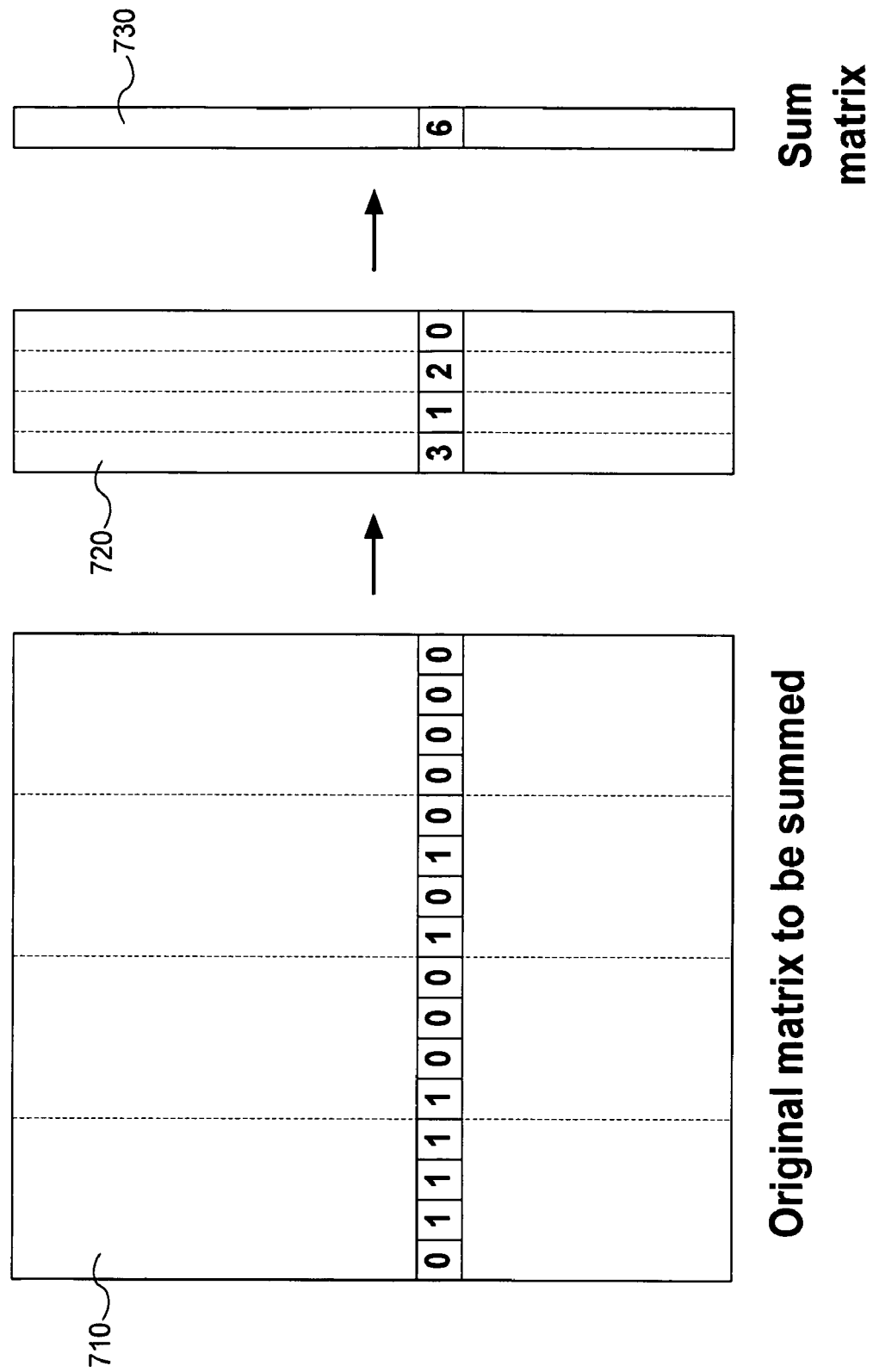
FIG. 7 is a block diagram of an example of multi-pass summation.

An example of this multi-pass summation is illustrated in FIG. 7. In FIG. 7, a matrix 710 needs to be summed across each row. One row is illustrated as an example row. In the example of FIG. 7, the matrix is summed by groups of four, so that the first four elements are summed into the first element of that row in a transitional sum matrix 720. Likewise, the second four elements are summed to the second element of the row, and so on. Then, in a second pass, the four elements of the transitional sum matrix are summed to produce a final sum for the row.

4.9 Implementation of Conditionals

Because of the single-instruction, multiple-data (SIME) nature of the GPU, conditionals can be a significant burden on performance. In many pixel shader program coding schemes, there are several different ways to encode these conditionals. However, in testing, the if instruction, the cmp instruction and the (p0) predicate, were each found to be slow.

To avoid this, in the case that the conditional checks for edge conditions, the it was found that an efficient solution is to elide the conditional altogether, and set the input stage of the GPU to "border color sampling." This allows for all accesses outside of the defined area of a texture to return 0. For non-border conditionals, we found it most efficient to encode the condition into a floating point number which is greater than 0 if and only if the condition is true. This number can be normalized to be exactly 0 or 1 by using the mul_sat instruction with a sufficiently large factor. This will recreate $I_{\{c\}}$, as used in the formulas.

4.10 Other Implementation Details

Each pass on the GPU carries with it a fixed performance overhead, in addition to the time needed to perform computations. In addition, the compiler contained in the GPU driver usually has no way of optimizing across pixel shader programs. Both of these factors make it important to coalesce as much computation as possible in each pixel shader program in order to achieve good performance.

Existing implementations of convolutional neural networks, designed for the CPU, treat each conceptual component of the computation as a separable function, e.g., convolution, subsampling, and their derivatives. The preceding analytical derivation of the start-to-end formulas provides an optimization specific to the GPU which reduces this overhead.

Additionally, because allocation and deallocation on the GPU is an expensive operation, to minimize costs, in a preferred implementation all pixel shader programs are defined and all textures are allocated at the beginning of the process and are reused until completion. Transmission of data between the CPU to the GPU is usually considered expensive, but because the amount of data is relatively small, it can be done without optimization without sacrificing a large amount of time. For example, in one implementation for each training sample all that is needed to be transmitted is only the pixel patch corresponding to the input (usually 29×29 pixels) and the correct classification.

5. Computing Environment

The above described neural network training techniques can be performed on any of a variety of devices in which digital media signal processing is performed, including among other examples, computers; image and video recording, transmission and receiving equipment; portable video players; video conferencing; and etc. The techniques can be implemented in hardware circuitry, as well as in digital media processing software executing within a computer or other computing environment, such as shown in FIG. 8.

Figure 8:
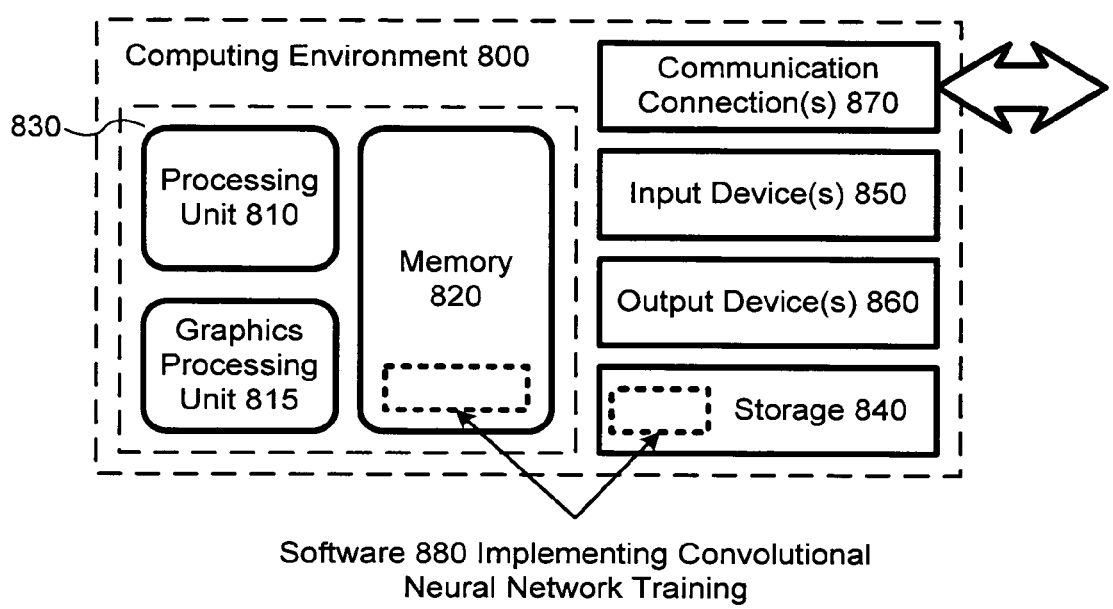
FIG. 8 is a block diagram of a suitable computing environment for implementing the convolutional neural network techniques of FIG. 6.

FIG. 8 illustrates a generalized example of a suitable computing environment (800) in which described embodiments may be implemented. The computing environment (800) is not intended to suggest any limitation as to scope of use or functionality of the invention, as the present invention may be implemented in diverse general-purpose or special-purpose computing environments.

With reference to FIG. 8, the computing environment (800) includes at least one processing unit (810), a GPU (815), and memory (820). In FIG. 8, this most basic configuration (830) is included within a dashed line. The processing unit (810) executes computer-executable instructions and may be a real or a virtual processor. In a multi-processing system, multiple processing units execute computer-executable instructions to increase processing power. The memory (820) may be volatile memory (e.g., registers, cache, RAM), non-volatile memory (e.g., ROM, EEPROM, flash memory, etc.), or some combination of the two. The memory (820) stores software (880) implementing the described encoder/decoder and efficient transform coefficient encoding/decoding techniques. The GPU (815) may be integrated with the processing unit 810 on a single board or may be contained separately. In one implementation, the GPU (815) has architecture as illustrated in FIG. 3.

A computing environment may have additional features. For example, the computing environment (800) includes storage (840), one or more input devices (850), one or more output devices (860), and one or more communication connections (870). An interconnection mechanism (not shown) such as a bus, controller, or network interconnects the components of the computing environment (800). Typically, operating system software (not shown) provides an operating environment for other software executing in the computing environment (800), and coordinates activities of the components of the computing environment (800).

The storage (840) may be removable or non-removable, and includes magnetic disks, magnetic tapes or cassettes, CD-ROMs, CD-RWs, DVDs, or any other medium which can be used to store information and which can be accessed within the computing environment (800). The storage (840) stores instructions for the software (880) implementing the described neural network training techniques.

The input device(s) (850) may be a touch input device such as a keyboard, mouse, pen, or trackball, a voice input device, a scanning device, or another device that provides input to the computing environment (800). For audio, the input device(s) (850) may be a sound card or similar device that accepts audio input in analog or digital form, or a CD-ROM reader that provides audio samples to the computing environment. The output device(s) (860) may be a display, printer, speaker, CD-writer, or another device that provides output from the computing environment (800).

The communication connection(s) (870) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available media that can be accessed within a computing environment. By way of example, and not limitation, with the computing environment (800), computer-readable media include memory (820), storage (840), communication media, and combinations of any of the above.

The neural network training techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

I claim:

1. A computer-implemented method for training a convolutional neural network to identify images using graphics data which can be read by a graphics processing unit ("GPU"), and one or more GPU-executable programs, the method comprising:

receiving the graphics data representing a state of the convolutional neural network and comprising one or more textures representing one or more neural network variables, wherein the one or more textures comprises a texture with two-dimensional addressing, and at least one or more of the textures represents a neural network variable with addressing of more than two dimensions which has been flattened into two dimensional addressing, the convolutional neural network comprising at least one layer comprising a plurality of patches;

executing one or more of the GPU-executable programs on the GPU in order to perform a forward pass in the convolutional neural network, the executing including performing convolution operations on the patches;

executing one or more of the GPU-executable programs on the GPU in order to perform a backward pass in the convolutional neural network, the executing including performing convolution operations on the patches;

executing one or more of the GPU-executable programs on the GPU in order to modify the patches in the convolutional neural network by changing the graphics data based on results of the backward pass; and repeating executing one or more of the GPU-executable programs to perform forward passes, backward passes, and to modify the graphics data until the convolutional neural network is trained.

2. The method of claim 1, wherein addresses of values represented in the texture with two-dimensional addressing are determined through linear combinations of x and y offset coordinates from the upper-left corner of an output texture.

3. The method of claim 1, wherein:
the GPU-executable programs are written in the form of one or more pixel shader programs.

4. The method of claim 1, wherein the graphics data is adjusted using gradient descent.

5. The method of claim 4, wherein:
the one or more program utilize formulas to compute partial derivatives to determine a gradient; and
the formulas are combined and simplified algebraically in order to reduce pixel shader program invocations.

6. The method of claim 1, wherein:
the neural network comprises one or more fully-connected layers; and
the one or more GPU-executable programs comprise one or more GPU-executable programs specific to the one or more fully-connected layers which utilize separate formulas for fully-connected layers.

7. The method of claim 1, wherein:
the neural network comprises one or more transitional layers; and
the one or more GPU-executable programs comprise one or more GPU-executable programs specific to the one or more transitional layers which utilize separate formulas for transitional layers.

8. The method of claim 1, wherein the graphics data describes a single triangle covering a viewport.

9. The method of claim 1, wherein:
the one or more GPU-executable programs comprises one or more summations; and
each of the one or more summations is broken up into multiple passes.

10. The method of claim 1, wherein the convolutional neural network performs handwriting recognition.

11. The method of claim 1, further comprising producing one or more computer-readable media containing data describing a convolutional network trained by the preceding process.

12. One or more computer-readable storage media storing instructions which, when executed on a graphics card, cause the graphics card to perform a method for training a convolutional neural network, the method comprising:
receiving a plurality of textures, the plurality of textures at least in part representing square convolutional kernels for the neural network, wherein at least some of the textures have two-dimensional addressing, and represent square convolutional kernels with addressing of more than two dimensions which have been flattened into two dimensional addressing;
computing a plurality of forward passes of the neural network on a plurality of input data including convoluting and subsampling the square convolutional kernels;
for each of the plurality of forward passes, computing a backward pass of the neural network using a gradient function; and
for each backward pass, based on the results of the gradient function, changing information contained in the square convolutional kernels from the plurality of textures to affect a training of the neural network.

13. The computer-readable storage media of claim 12, wherein:
the neural network is being trained to recognize handwritten characters;
the plurality of textures at least in part represents convolutional kernels; and
the convolutional kernels operate on input data representing handwritten characters.

14. The computer-readable storage media of claim 12, wherein the plurality of textures at least in part represents a fully-connected neural network level and a transitional level.

15. A graphics processing unit configured to perform a method for training a handwriting-recognition convolutional neural network, wherein the convolutional neural network comprises one or more of layers, at least some of the layers each comprising a plurality of square convolutional kernel patches, and wherein the graphics processing unit comprises:
data storage, configured to store one or more graphics textures, the graphics textures describing the square convolutional kernel patches of the handwriting-recognition neural network, wherein at least some of the graphical textures have two-dimensional addressing and represent square convolutional kernel patches having addressing of more than two dimensions which have been flattened into two dimensional addressing;
a plurality of pixel shader units configured via pixel shader programming:
to perform repeated forward passes and backward passes of the neural network on handwriting input data, the passes including performing convolutional operations on the square convolutional kernel patches;
to store results in the plurality of graphics textures; and
to modify the square convolutional kernel patches of the plurality of textures based on results of the forward and backward passes in order to train the neural network.

16. The graphics processing unit of claim 15, wherein the handwriting-recognition neural network at least in part comprises one convolutional level and one fully-connected level.

17. The graphics processing unit of claim 15, wherein the one or more graphics textures are configured to describe a simplified triangle image, such that all processing performed by the graphics processing unit only requires computation on the part of the pixel shader units.

18. The graphics processing unit of claim 15, wherein the pixel shader units are configured such that summations in the forward passes and backward passes of the neural network are broken up into multiple smaller summations.

* * * * *